United States Patent
Tomono

(10) Patent No.: US 10,104,346 B2
(45) Date of Patent: Oct. 16, 2018

(54) PROJECTOR AND CONTROL METHOD FOR PROJECTOR

(71) Applicant: SEIKO EPSON CORPORATION, Tokyo (JP)

(72) Inventor: Mitsunori Tomono, Shimosuwa-Machi (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/557,335

(22) PCT Filed: Mar. 3, 2016

(86) PCT No.: PCT/JP2016/001178
§ 371 (c)(1),
(2) Date: Sep. 11, 2017

(87) PCT Pub. No.: WO2016/152043
PCT Pub. Date: Sep. 29, 2016

(65) Prior Publication Data
US 2018/0054601 A1 Feb. 22, 2018

(30) Foreign Application Priority Data
Mar. 24, 2015 (JP) .................. 2015-061402

(51) Int. Cl.
*H04N 9/31* (2006.01)
*G09G 5/00* (2006.01)
(Continued)

(52) U.S. Cl.
CPC ............... *H04N 9/31* (2013.01); *G03B 17/54* (2013.01); *G03B 21/206* (2013.01); *G03B 21/26* (2013.01);
(Continued)

(58) Field of Classification Search
CPC ........... H04N 9/31; H04N 5/74; G03B 21/206
(Continued)

(56) References Cited

U.S. PATENT DOCUMENTS

2011/0075101 A1 3/2011 Sato et al.
2013/0100009 A1* 4/2013 Willis .................. H04N 9/3147
345/156

(Continued)

FOREIGN PATENT DOCUMENTS

JP 2011-070086 A 4/2011

OTHER PUBLICATIONS

May 17, 2016 Search Report issued in International Patent Application No. PCT/JP2016/001178.

*Primary Examiner* — Michael Lee
(74) *Attorney, Agent, or Firm* — Oliff PLC

(57) ABSTRACT

A projector includes: a connection unit which connects to a network; a storage unit which stores connection information used for connection to the network; a projection unit which projects an image on a projection surface; a first projection control unit which projects a first identification image, with a direction of projection by the projection unit changed to a plurality directions; an image pickup unit which picks up an image of the projection surface; a first detection unit which detects a second identification image projected in an image pickup area of the image pickup unit by another projector, from the image picked up by the image pickup unit; and a second projection control unit which projects a third identification image showing the connection information stored in the storage unit, with the direction of projection being a direction corresponding to a position where the second identification image is detected.

10 Claims, 8 Drawing Sheets

(51) Int. Cl.
  *H04N 5/74*   (2006.01)
  *G03B 21/20*  (2006.01)
  *G03B 17/54*  (2006.01)
  *G03B 21/26*  (2006.01)

(52) U.S. Cl.
  CPC ............... *G09G 5/00* (2013.01); *H04N 5/74* (2013.01); *H04N 9/3147* (2013.01); *H04N 9/3179* (2013.01); *H04N 9/3194* (2013.01); *G03B 2206/00* (2013.01)

(58) Field of Classification Search
  USPC ........................................ 348/744
  See application file for complete search history.

(56) References Cited

U.S. PATENT DOCUMENTS

| | | | |
|---|---|---|---|
| 2013/0229396 A1* | 9/2013 | Huebner | H04N 9/3147 345/207 |
| 2015/0084839 A1* | 3/2015 | Ichieda | H04N 9/3147 345/2.3 |
| 2015/0254486 A1* | 9/2015 | Shigemitsu | G06F 3/005 235/462.11 |

* cited by examiner

WHERE DISTANCE
BETWEEN
PROJECTORS IS LARGE

PROJECTOR AND CONTROL METHOD FOR PROJECTOR

TECHNICAL FIELD

The present invention relates to a technique of setting, on a projector, connection information used for connection to a network.

BACKGROUND ART

A technique of simultaneously projecting with a plurality of projectors arranged side by side is known. In that case, the plurality of projectors needs to be linked by being connected to each other via a network or the like. As a technique of linking a plurality of projectors, the technique of PTL 1 is known. PTL 1 discloses that, in order to make driving conditions uniform among a plurality of projectors, one projector projects a code (for example, a QR code (trademark registered)) including a driving condition using infrared rays whereas the other projector(s) picks up an image of the code, acquires the driving condition and reflects this on its/their own driving condition.

CITATION LIST

Patent Literature

PTL 1: JP-A-2011-70086

SUMMARY OF INVENTION

Technical Problem

In order to connect a plurality of projectors to each other via a network, connection information to the network needs to be shared. Using the method of PTL 1 to share the connection information is conceivable but has the following problem. The image pickup device provided in the projector is generally used for correction processing such as keystone correction or for detection of the position of a pointer with an interactive projector. This image pickup device uses only a projection surface where the projector projects an image and the peripheries of the projection surface, as an image pickup area. Therefore, with the technique disclosed in PTL 1, if the distance between the plurality of projectors is somewhat large, an image of the code projected by one projector cannot be picked up by the other projector(s). Also, with a configuration where the user sets connection information used for connection to the network, by manual input to the projector, there is a heavy burden of operation on the user.

In view of the foregoing circumstances, an object of the invention is to provide a technique for carrying out communication between a plurality of projectors of connection information used for connection to the network, by a method which is less susceptible to the influence of the positional relationship between the plurality of projectors and which causes less burden of operation on the user.

Solution to Problem

In order to achieve the foregoing object, a projector according to an aspect of the invention includes: a connection unit which connects to a network; a storage unit which stores connection information used for connection to the network; a projection unit which projects an image on a projection surface; a first projection control unit which projects a first identification image, with a direction of projection by the projection unit changed to a plurality directions; an image pickup unit which picks up an image of the projection surface; a first detection unit which detects a second identification image projected in an image pickup area of the image pickup unit by another projector, from the image picked up by the image pickup unit; and a second projection control unit which projects a third identification image showing the connection information stored in the storage unit, with the direction of projection being a direction corresponding to a position where the second identification image is detected.

According to the invention, an identification image showing connection information is projected, with the direction of projection changed according to the direction in which another projector exists. Therefore, communication between a plurality of projectors of connection information used for connection to the network can be carried out by a method which is less susceptible to the influence of the positional relationship between the plurality of projectors and which causes less burden of operation on the user.

In this invention, the projector may include: a second detection unit which detects the first identification image projected in the image pickup area by the another projector, from the image picked up by the image pickup unit, in the case of acquiring the connection information stored in the storage unit from the another projector; a third projection control unit which projects the second identification image, with the direction of projection being a direction corresponding to a position where the first identification image is detected; a third detection unit which detects the third identification image projected in the image pickup area by the another projector, from the image picked up by the image pickup unit; and an acquisition unit which acquires the connection information, based on the third identification image that is detected. The connection unit may connect to the network, using the connection information that is acquired.

According to the invention, connection information from another projector can be acquired by a method which is less susceptible to the influence of the positional relationship between the plurality of projectors and which causes less burden of operation on the user.

A projector according to another aspect of the invention includes: a connection unit which connects to a network; a storage unit which stores connection information used for connection to the network; a projection unit which projects an image on a projection surface; a first projection control unit which projects a first identification image showing the connection information stored in the storage unit, with a direction of projection by the projection unit changed to a plurality directions; an image pickup unit which picks up an image of the projection surface; a first detection unit which detects a second identification image projected in an image pickup area of the image pickup unit by another projector, from the image picked up by the image pickup unit; and a second projection control unit which projects a third identification image showing the connection information stored in the storage unit, with the direction of projection being a direction corresponding to a position where the second identification image is detected.

According to the invention, an identification image showing connection information is projected, with the direction of projection changed to a plurality of directions. Therefore, communication between a plurality of projectors of connection information used for connection to the network can be carried out by a method which is less susceptible to the influence of the positional relationship between the plurality of projectors and which causes less burden of operation on the user.

In this invention, the projector may include: a second detection unit which detects the first identification image projected in the image pickup area by the another projector, from the image picked up by the image pickup unit, in the case of acquiring the connection information stored in the storage unit from the another projector; an acquisition unit which acquires the connection information, based on the first identification image that is detected; a third projection control unit which projects the second identification image, with the direction of projection being a direction corresponding to a position where the first identification image is detected, if the connection information is not acquired; and a third detection unit which detects the third identification image projected in the image pickup area by the another projector, from the image picked up by the image pickup unit. The acquisition unit may acquire the connection information, based on the third identification image that is detected. The connection unit may connect to the network, using the connection information that is acquired.

According to the invention, connection information from another projector can be acquired by a method which is less susceptible to the influence of the positional relationship between the plurality of projectors and which causes less burden of operation on the user.

In this invention, the second projection control unit may project the third identification image showing an image formed by reducing the first identification image.

According to the invention, even if the distance from another projector is relatively large, this another projector can be allowed to easily pick up the entirety of an identification image showing connection information.

Moreover, the projection unit may include a projection lens which emits image light representing an image toward the projection surface, and a drive unit which causes the projection lens to move. The first projection control unit and the second projection control unit may control the drive unit to change the direction of projection.

According to the invention, the complication of the mechanism for changing the direction of projection can be restrained.

In the invention, the image pickup unit may be an image pickup unit for correction processing to pick up an image of the projection surface and correct the image, or for position detection to detect a position of a pointer pointing to a position on the projection surface.

According to the invention, communication of connection information can be carried out using the image pickup unit provided in an existing projector.

A control method for a projector according to the invention is a control method for a projector including a connection unit which connects to a network, a storage unit which stores connection information used for connection to the network, and a projection unit which projects an image on a projection surface. The control method includes: projecting a first identification image, with a direction of projection by the projection unit changed to a plurality directions; picking up an image of the projection surface; detecting a second identification image projected in an image pickup area in the picking up of the image by another projector, from the image that is picked up; and projecting a third identification image showing the connection information stored in the storage unit, with the direction of projection being a direction corresponding to a position where the second identification image is detected.

According to the invention, an identification image showing connection information is projected, with the direction of projection changed according to the direction in which another projector exists. Therefore, communication between a plurality of projectors of connection information used for connection to the network can be carried out by a method which is less susceptible to the influence of the positional relationship between the plurality of projectors and which causes less burden of operation on the user.

Another control method for a projector according to the invention is a control method for a projector including a connection unit which connects to a network, a storage unit which stores connection information used for connection to the network, and a projection unit which projects an image on a projection surface. The control method includes: projecting a first identification image showing the connection information stored in the storage unit, with a direction of projection by the projection unit changed to a plurality directions; picking up an image of the projection surface; detecting a second identification image projected in an image pickup area in the picking up of the image by another projector, from the image that is picked up; and projecting a third identification image showing the connection information stored in the storage unit, with the direction of projection being a direction corresponding to a position where the second identification image is detected.

According to the invention, an identification image showing connection information is projected, with the direction of projection changed to a plurality of directions. Therefore, communication between a plurality of projectors of connection information used for connection to the network can be carried out by a method which is less susceptible to the influence of the positional relationship between the plurality of projectors and which causes less burden of operation on the user.

DESCRIPTION OF EMBODIMENTS

Hereinafter, embodiments of the invention will be described with reference to the drawings.

First Embodiment

Figure 1:
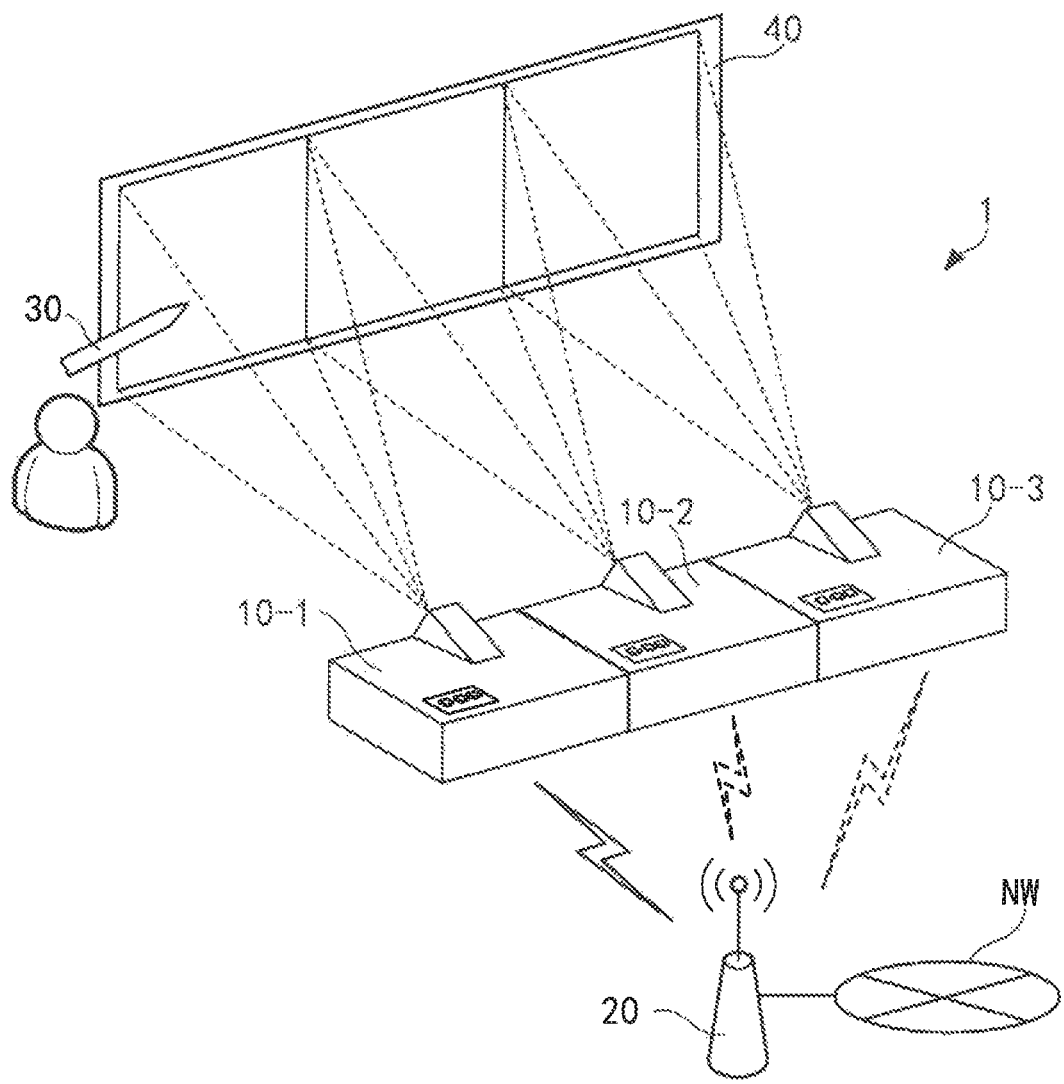
FIG. 1 is a view showing the overall configuration of a projection system according to a first embodiment of the invention.

FIG. 1 is a view showing the overall configuration of a projection system 1 according to a first embodiment of the invention. As shown in FIG. 1, the projection system 1 includes projectors 10-1, 10-2, 10-3 as a plurality of projectors 10. The projectors 10-1, 10-2, 10-3 carry out, for example, tiled projection in which images from the respective projectors 10 are arranged side by side on a screen 40. In the example of FIG. 1, the projectors are arranged in order of the projectors 10-1, 10-2, 10-3. The projectors 10-1, 10-2, 10-3 may be arranged in contact with the neighboring projector(s) or may be slightly spaced apart from each other.

The projectors 10 are, for example, liquid crystal projectors and projection-type display devices which project an image on the screen 40. The projectors 10 project a color image, for example, based on an image signal corresponding to the respective color components of the three primary colors of R (red), G (green) and B (blue) inputted from a video signal source (video source), not illustrated. The screen 40 in this case is a reflection-type screen and is equivalent to a projection surface where images are projected by the projectors 10. Also, as the projection surface, an object other than the screen 40, for example, a wall may be used instead.

The projectors 10 are connected to a network NW via an AP 20 and have the function of carrying out wireless communication in conformity with the IEEE 802.11 (Wi-Fi (trademark registered)) standard. The projectors 10-1, 10-2, 10-3 can exchange information necessary for tiled projection by being connected to each other via the network NW. The AP 20 is a wireless access point. The AP 20 connects to the projector 10 which accesses the AP 20 using connection information unique to the AP 20. The connection information includes, for example, identification information to identify the AP 20 and authentication information used for authentication to connect to the network NW. The connection information includes, for example, security information such as SSID (service set identifier) or encryption key according to WEP (wired equivalent privacy), IP address, and MAC address.

The standard for wireless communication carried out by the projectors 10 is not particularly specified. For example, wireless LAN (local area network) standards other than Wi-Fi may be employed. Also, the information included in the connection information varies depending on the wireless communication standard. Each of the projectors 10-1, 10-2, 10-3 acquires an image for tiled projection from an image supply device (for example, personal computer or the like), not illustrated, via the network NW and the AP 20.

Also, the projectors 10 function as interactive whiteboards (electronic blackboards), detect an operation carried out on the screen 40 by the user using a pointer 30, and carry out processing corresponding to the operation. The pointer 30 is, for example, a pen-type device and a pointer which the user uses in order to point to a position on the screen 40. The pointer 30 is not limited to the pen-type and may be an operation device in other shapes such as a stick-shape. Also, a pointer such as a user's hand or finger may be substituted for the pointer 30.

Figure 2:
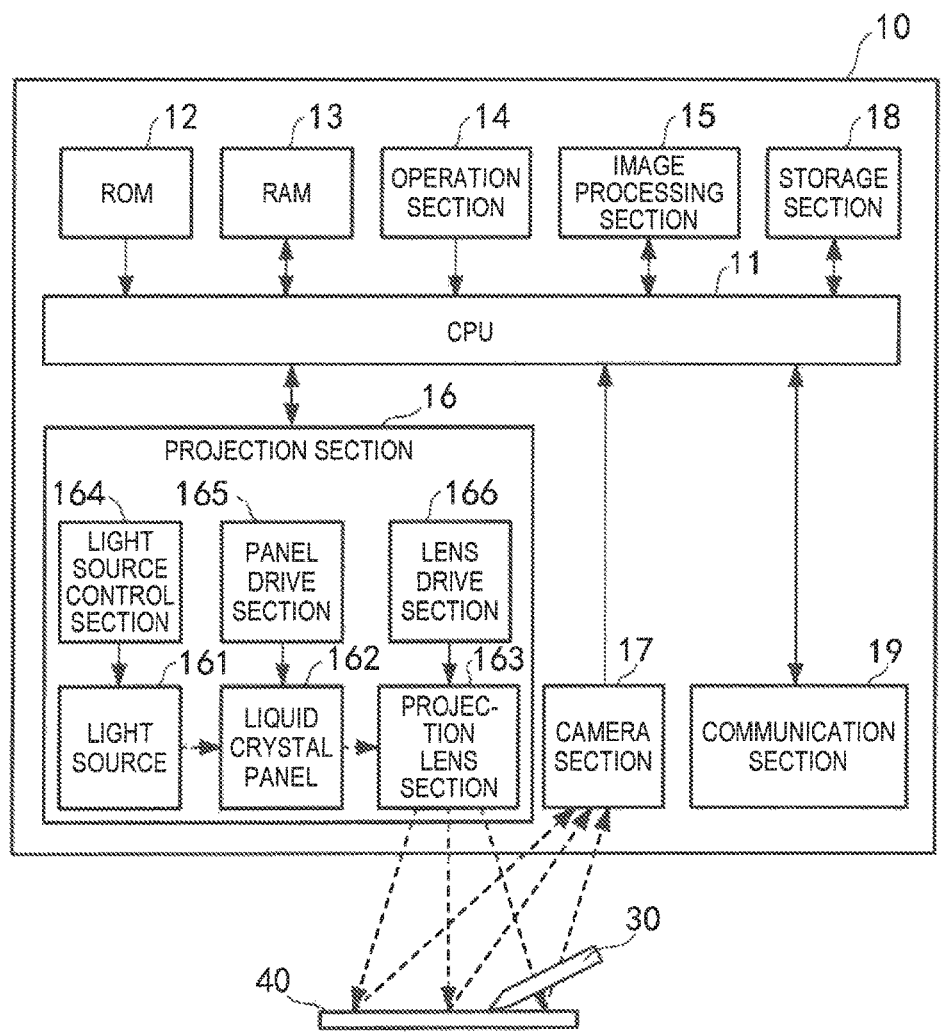
FIG. 2 is a block diagram showing the hardware configuration of a projector according to the embodiment.

FIG. 2 is a block diagram showing the hardware configuration of the projector 10. As shown in FIG. 2, the projector 10 includes a CPU (central processing unit) 11, a ROM (read only memory) 12, a RAM (random access memory) 13, an operation section 14, an image processing section 15, a projection section 16, a camera section 17, a storage section 18, and a communication section 19.

The CPU 11 is a processor which controls each part of the projector 10 by reading out a program stored in a storage unit such as ROM 12 to the RAM 13 and executing the program. The operation section 14 is an operation unit having an operator for carrying out various operations such as switching on/off the power of the projector 10.

The image processing section 15 has an image processing circuit such as ASIC (application specific integrated circuit), for example, and takes charge of image processing carried out in the projector 10. The image processing section 15, under the control of the CPU 11, carries out correction processing such as resizing or keystone correction, for example, on an image signal inputted from a video signal source and generates image information for projection. The correction processing is carried out based on an image of the screen 40 picked up by the camera section 17.

The projection section 16 projects an image on the screen 40, based on the image information that is image-processed by the image processing section 15. The projection section 16 includes a light source 161, a liquid crystal panel 162, a projection lens section 163, a light source control section 164, a panel drive section 165, and a lens drive section 166. The light source 161 is solid state light source including, for example, an LED (light emitting diode) or semiconductor diode, and emits light to the liquid crystal panel 162. The liquid crystal panel 162 is, for example, a transmission-type liquid crystal panel, and a light modulator which modulates the light incident thereon from the light source 161. The liquid crystal panel 162 is provided corresponding to each of the three primary colors of RGB. The projection lens section 163 has one or a plurality of projection lenses, and a lens shift mechanism, and emits the image light representing an image modulated by the liquid crystal panel 162 toward the screen 40. The lens shift mechanism includes, for example, a moving part which supports the projection lens and can move in up-down directions and left-right directions (directions orthogonal to the optical axis). The light source control section 164 drives the light source 161 under the control of the CPU 11. The panel drive section 165 drives the liquid crystal panel 162, based on the image information supplied from the CPU 11. The lens drive section 166 is equivalent to the drive unit of the invention and drives the lens shift mechanism of the projection lens section 163 under the control of the CPU 11. The lens drive section 166 drives the lens shift mechanism under the control of the CPU 11 and causes the projection lens to move in the up-down directions and the left-right directions. With the movement of the projection lens, the direction of projection changes, which is the direction in which the projection section 16 projects an image.

The camera section 17 has an image sensor (for example, CMOS sensor or CCD sensor) and picks up an image of the screen 40. The CPU 11 detects the position of the pointer 30, based on the light emitted from the pointer 30 whose image is picked up by the camera section 17. Instead of this, the projector 10 may recognize the shape of the pointer 30 by pattern recognition or the like and thus detect the position pointed to by the pointer. In this way, the camera section 17 is also an image pickup unit for position detection to detect the position of the pointer 30 pointing to a position on the screen 40.

Also, the projector 10 may detect the position indicated by reflected light from the pointer 30, for example, by a method using a light curtain or the like.

The storage section 18 has, for example, a non-volatile semiconductor memory as a memory where data can be read and written. The storage section 18 stores the connection information set on the projector 10. The CPU 11 performs control to cause the communication section 19 to connect to the network NW, using the connection information that is set.

The communication section 19 has, for example, a wireless communication circuit and an antenna, and connects to the network NW via the AP 20.

The projector 10 having the foregoing configuration operates, based on a master mode which is a first mode and a slave mode which is a second mode. In the case of the master mode, the projector 10 carries out processing to communicate the connection information stored in the storage section 18 to another projector 10. In the case of the slave mode, the projector 10 carries out processing to acquire the connection information communicated from another projector 10.

In the description below, the projector 10-1 is wirelessly connected to the AP 20, and the projectors 10-2, 10-3 are not wirelessly connected to the AP 20, unless stated otherwise. That is, connection information is stored in the storage section 18 of the projector 10-1, and connection information is not stored in the storage units 18 of the projectors 10-2, 10-3. In order to carry out tiled projection with the projectors 10-1, 10-2, 10-3, the projectors 10-2, 10-3 need to get wirelessly connected to the AP 20, using the connection information stored in the projector 10-1.

Figure 3:
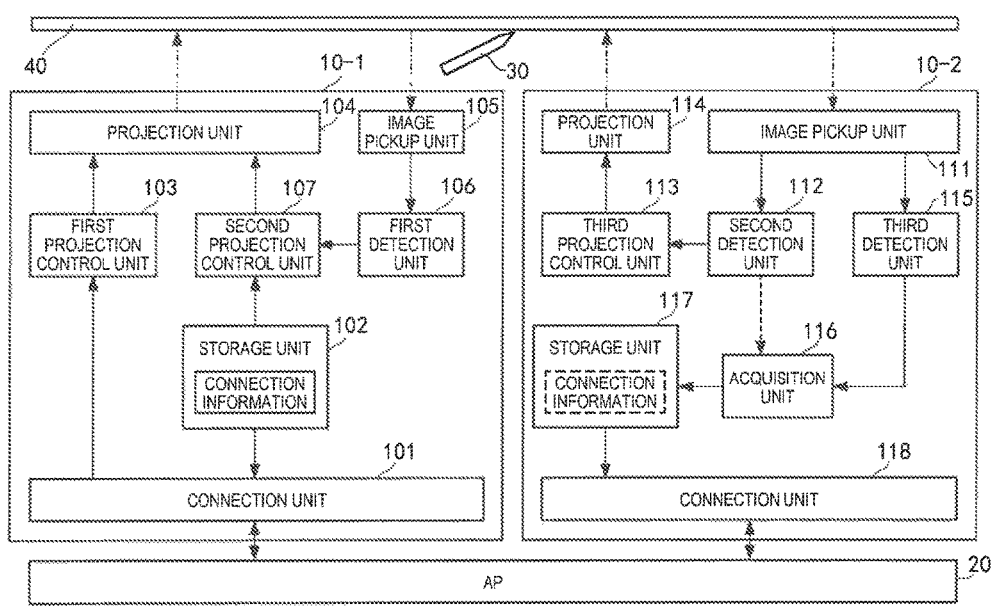
FIG. 3 is a block diagram showing the functional configuration of the projector according to the embodiment.

FIG. 3 is a block diagram showing the functional configuration of the projector 10. FIG. 3 shows the functional configuration in the case where the projector 10-1 operates in the master mode and where the projector 10-2 operates in the slave mode. The dashed line arrows shown in FIG. 2 indicate flows of signals in a second embodiment, described later, and therefore are unrelated to this embodiment.

A connection unit 101 of the projector 10-1 is a unit which connects to the network NW via the AP 20. The connection unit 101 connects to the AP 20, using connection information stored in a storage unit 102. The connection unit 101 is realized by the CPU 11 and the communication section 19. The storage unit 102 is realized by the storage section 18.

A first projection control unit 103 of the projector 10-1 is a unit which projects a first identification image, with the direction of projection by a projection unit 104 changed to a plurality of directions. The first identification image in this case is an image showing that a projector 10 which operates in the slave mode is being searched for. The first projection control unit 103 is realized by the CPU 11. The projection unit 104 is realized by the projection section 16.

A second detection unit 112 of the projector 10-2 is a unit which detects the first identification image projected in an image pickup area of an image pickup unit 111, from an image picked up by the image pickup unit 111, in the case of acquiring the connection information stored in a storage unit 117. The image pickup unit 111 is realized by the camera section 17. The second detection unit 112 is realized by the CPU 11 and the image processing section 15.

A third projection control unit 113 of the projector 10-2 is a unit which projects a second identification image, with the direction of projection by a projection unit 114 being a direction corresponding to the position where the first identification image is detected. The second identification image in this case is an image showing that there is a projector 10 which operates in the slave mode. The third projection control unit 113 is realized by the CPU 11.

A first detection unit 106 of the projector 10-1 is a unit which detects the second identification image projected in an image pickup area of an image pickup unit 105, from the image picked up by the image pickup unit 105. The first detection unit 106 is realized by the CPU 11 and the image processing section 15.

A second projection control unit 107 is a unit which projects a third identification image showing the connection information stored in the storage unit 102, with the direction of projection by the projection unit 104 being the direction corresponding to the position where the second identification image is detected. The second projection control unit 107 is realized by the CPU 11.

A third detection unit 115 of the projector 10-2 is a unit which detects a third identification image projected in the image pickup area of the image pickup unit 111, from the image picked up by the image pickup unit 111. An acquisition unit 116 is a unit which acquires connection information, based on the third identification image that is detected. The storage unit 117 is a unit which stores the connection information acquired by the acquisition unit 116. A connection unit 118 is a unit which connects to the network NW via the AP 20, using the connection information acquired by the acquisition unit 116 and stored by the storage unit 117. The second detection unit 112 is realized by the CPU 11 and the image processing section 15. The acquisition unit 116 is realized by the CPU 11.

Meanwhile, the projector 10-1, in the case of operating in the slave mode, realizes the functions of the projector 10-2 described with reference to FIG. 3. Also, the projector 10-2, in the case of operating in the master mode, realizes the functions of the projector 10-1 described with reference to FIG. 3. Although not described here, the projector 10-3 operates in the master mode and the slave mode as well.

Next, the operations in this embodiment will be described.

Figure 4:
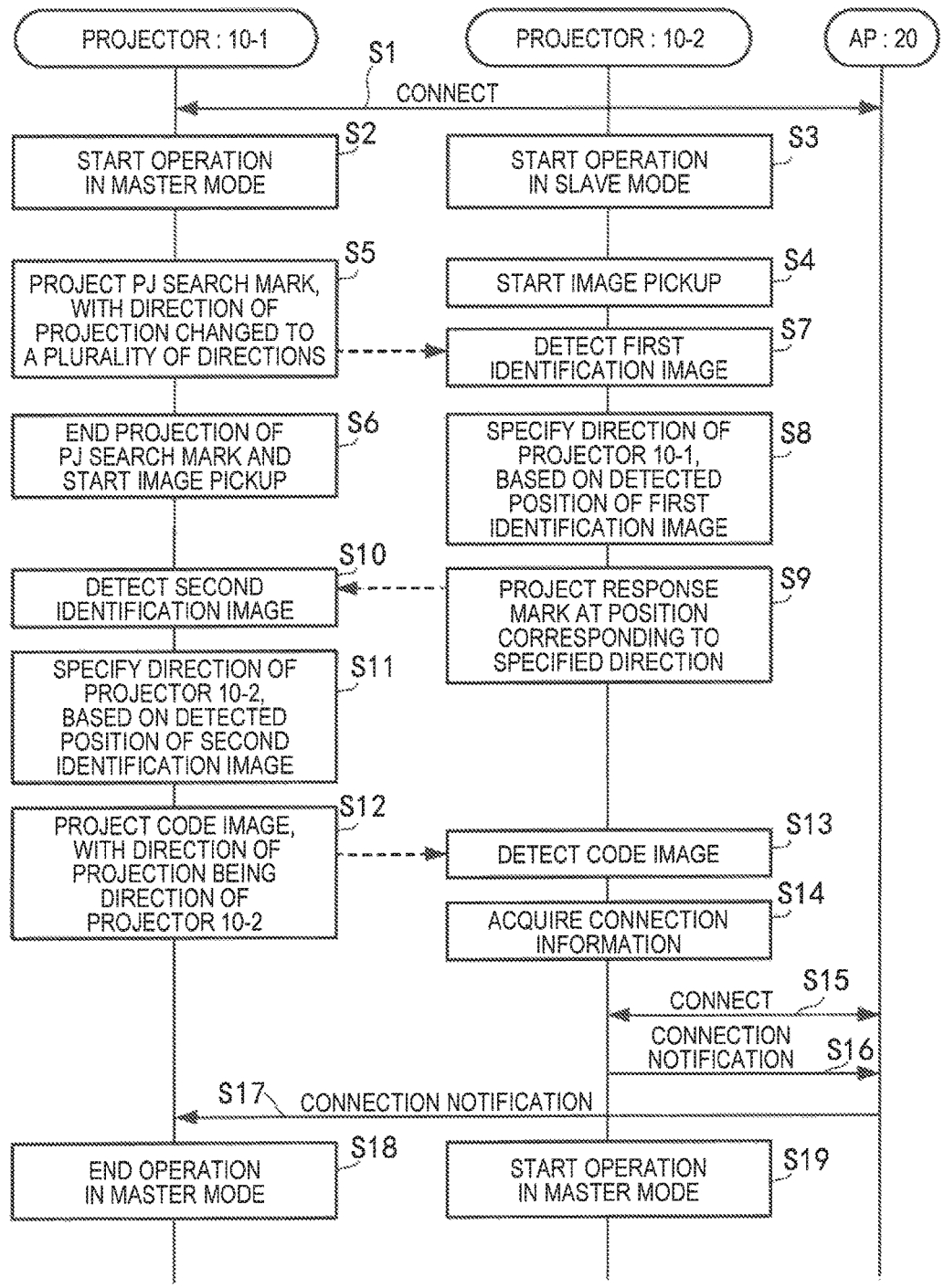
FIG. 4 is a sequence chart showing the processing of communicating connection information executed in the projection system according to the embodiment.

FIG. 4 is a sequence chart showing the processing of communicating connection information executed in the projection system 1. FIG. 5 and FIG. 6 are views for explaining an image projected on the screen 40 in the processing of communicating connection information.

Figure 5A:
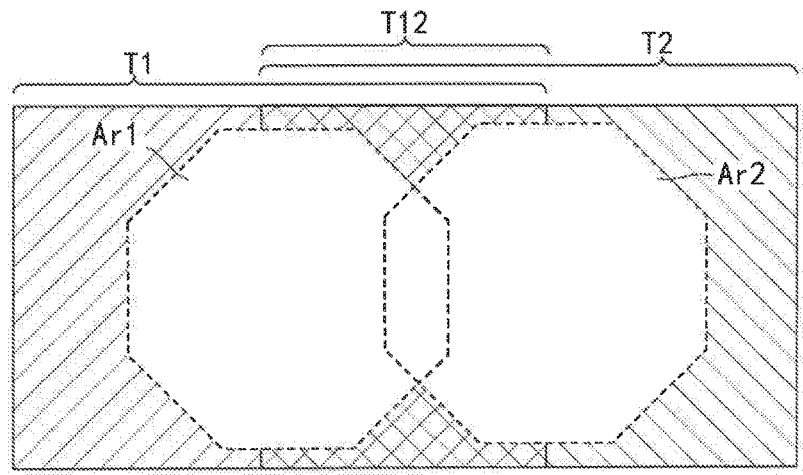
FIG. 5 is a view showing an image projected in the processing of communicating connection information according to the embodiment.

First, the image pickup areas of the projectors 10-1, 10-2 and a projectable area where an image can be projected will be described referring to FIG. 5(A). An image pickup area T1 is an area whose image is picked up by the camera section 17 of the projector 10-1. An image pickup area T2 is an area whose image is picked up by the camera section 17 of the projector 10-2. The image pickup area T1 and the image pickup area T2 are arranged side by side in a left-right direction, similarly to the direction in which the projectors 10-1, 10-2 are arranged. The image pickup area T1 and the image pickup area T2 partly overlap each other in an image pickup area T12. A projectable area Ar1 is an area where the projector 10-1 can project an image, and is included in its entirety in the image pickup area T1. Also, the projectable area Ar1 is partly included in the image pickup area T2. A projectable area Ar2 is an area where the projector 10-2 can project an image, and is included in its entirety in the image pickup area T2. Also, the projectable area Ar2 is partly included in the image pickup area T1. The projectable areas Ar1, Ar2 are areas where an image can be projected by a control in which the direction of projection is changed by the lens shift mechanism. These are larger areas than in the case where this control is not performed. The shape of the projectable areas Ar1, Ar2 illustrated in FIG. 5(A) or the like is octagonal. However, this is based on the limitations of the left shift mechanism employed in this embodiment. The shape may be, for example, quadrilateral.

Now, the sequence chart of FIG. 4 will be described.

The projector 10-1 first connects to the AP 20, using connection information stored in advance (Step S1). Next, the projector 10-1 starts the operation in the master mode (Step S2). The projector 10-2 starts the operation in the slave mode (Step S3). The projector 10-2, having started the operation in the slave mode, starts image pickup of the image pickup area T2 (Step S4).

The start of the operation in the master mode or the slave mode is triggered, for example, by a predetermined operation carried out by the user, but may also be triggered by things other than this.

Figure 5B:
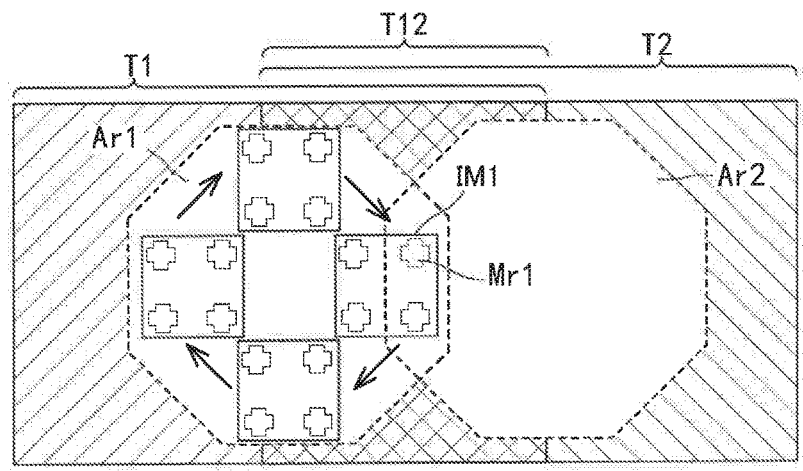

The projector 10-1, having started the operation in the master mode, projects a PJ search mark with the direction of projection changed to a plurality of directions (Step S5). The projector 10-1 causes the projection lens section 163 to move in the four directions of the up-down directions and the left-right directions and projects a PJ search mark IM1 at four positions as shown in FIG. 5(B). The PJ search mark IM1 is an image in which a first identification image Mr1 is arranged in the four corners of a rectangular image area. The first identification image Mr1 in this case is a cross-shaped image but may be an image of any predetermined pattern. It is assumed that the first identification image Mr1 is projected in its entirety in the image pickup area T2 at least once. Here, the projector 10-1 displays the PJ search mark IM1 in order clockwise as indicated by arrows in FIG. 5(B). However, its order is not particularly limited.

After projecting the PJ search mark IM1 by the method described with reference to FIG. 5(B), the projector 10-1 ends the projection and starts image pickup of the image pickup area T1 by the camera section 17 (Step S6).

The projector 10-2, having started the image pickup in Step S4, carries out the processing of detecting the first identification image Mr1 from the image picked up by the camera section 17. When the PJ search mark IM1 is projected in an area in the rightward direction within the projectable area Ar1, as shown in FIG. 5(B), the projector 10-2 detects the first identification image Mr1 projected in the image pickup area T2 (Step S7). Next, the projector 10-2 specifies the direction of the projector 10-1, based on the position where the first identification image Mr1 is detected (Step S8). As shown in FIG. 5(B), the projector 10-2 detects the first identification image Mr1 in an area in the leftward direction within the image pickup area T2 and therefore specifies the direction in which the projector 10-1 exists, as the leftward direction.

Figure 5C:
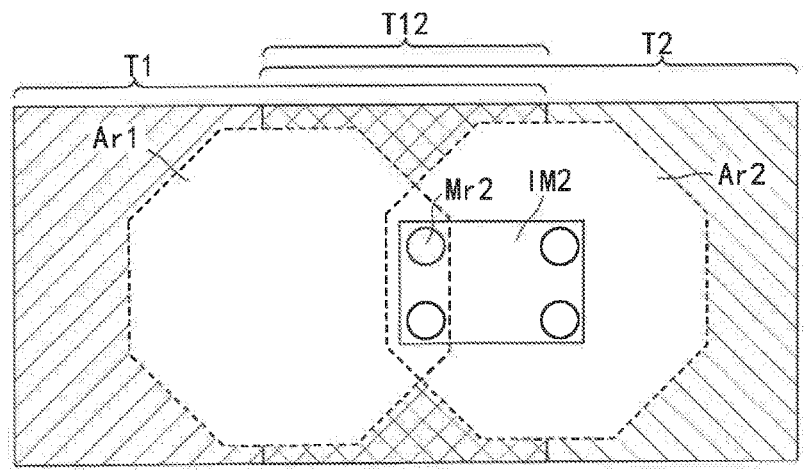

Next, the projector 10-2 projects a response mark IM2, with the direction of projection being the direction of the projector 10-1 specified in Step S8, as shown in FIG. 5(C) (Step S9). The response mark IM2 is an image in which a second identification image Mr2 is arranged in the four corners of a rectangular image area. The second identification image Mr2 in this case is a circular image but may be an image of any predetermined pattern. It is assumed that at least one of the second identification images Mr2 is displayed in its entirety in the image pickup area T1.

The projector 10-1, having started the image pickup in Step S6, carries out the processing of detecting the second identification image Mr2 from the image picked up by the camera section 17. Since the response mark IM2 is projected in an area in the leftward direction within the projectable area Ar2, as shown in FIG. 5(C), the projector 10-1 detects the second identification image Mr2 projected in the image pickup area T1 (Step S10). Next, the projector 10-1 specifies the direction of the projector 10-2, based on the position where the second identification image Mr2 is detected (Step S11). As shown in FIG. 5(C), the projector 10-1 detects the second identification image Mr2 in an area in the rightward direction within the image pickup area T1. Therefore, the projector 10-1 specifies the direction in which the projector 10-2 exists, as the rightward direction.

Figure 6A:
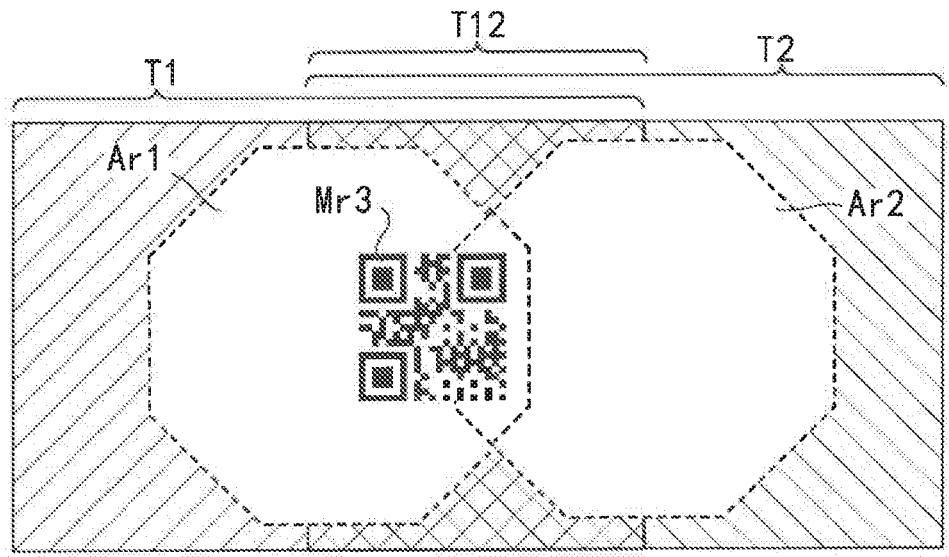
FIG. 6 is a view showing an image projected in the processing of communicating connection information according to the embodiment.

Next, the projector 10-1 projects a code image Mr3, with the direction of projection being the direction of the projector 10-2 specified in Step S11, as shown in FIG. 6(A) (Step S12). The code image Mr3 is equivalent to the third identification image of the invention. The code image Mr3 in this case is a QR code formed by encoding connection information. The code image Mr3 is projected in its entirety in the image pickup area T2.

Also, as the code image Mr3, a matrix-type two-dimensional code, barcode, or three-dimensional code in which a two-dimensional code is changed in time series may be used other than a QR code.

The projector 10-2 detects the code image Mr3 projected in an area in the leftward direction within the image pickup area T2, from the image picked up by the camera section 17 (Step S13). Next, the projector 10-2 acquires connection information, based on the code image Mr3 that is detected (Step S14). The projector 10-2 can decode connection information from the code image Mr3 with a known algorithm. Next, the projector 10-2 stores the acquired connection information in the storage section 18, connects to the AP 20 using this connection information, and connects to the network NW via the AP 20 (Step S15).

After connecting to the network NW via the AP 20, the projector 10-2 sends a connection notification indicating the completion of connection to the projector 10-1 via the AP 20 and the network NW (Steps S16, S17). On receiving this connection notification, the projector 10-1 ends the operation in the master mode (Step S18).

The projector 10-2, having sent the connection notification, starts the operation in the master mode in order to communicate the connection information to the projector 10-3 in the slave mode (Step S19). Subsequently, the processing of communication in which the projector 10-2 operates in the master mode and in which the projector 10-3 operates in the slave mode is carried out. This processing of communication can be analogized with the description with reference to FIG. 4 and therefore its description is omitted.

If the second identification image Mr2 is not detected in the processing of Step S10 even when a predetermined time has passed from the start of the image pickup, the projector 10-1 determines that it is a time-out, and ends the operation in the master mode. Meanwhile, if the first identification image Mr1 is not detected in the processing of Step S7 even when a predetermined time has passed from the start of the image pickup, the projector 10-2 determines that it is a time-out, and ends the operation in the slave mode.

Figure 6B:
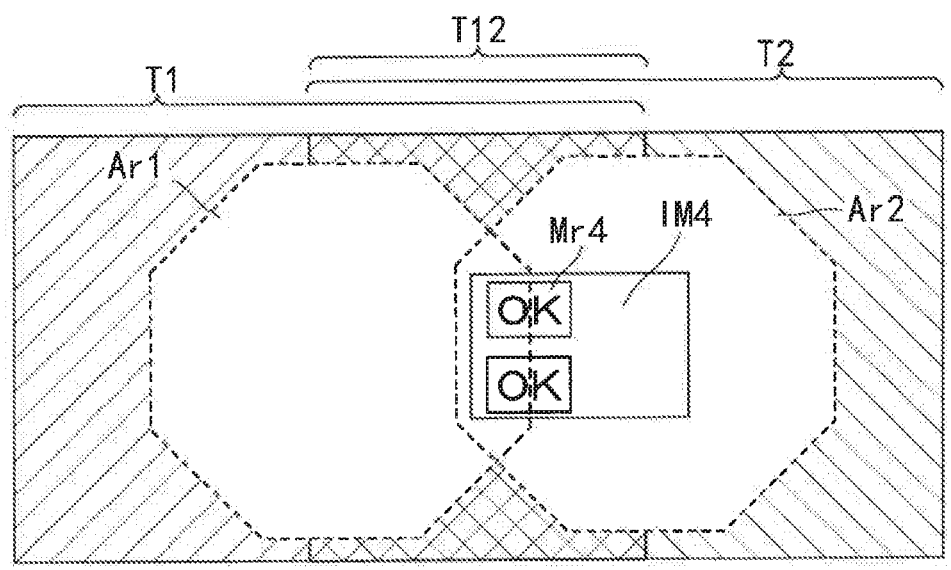

Instead of the processing of Steps S16, S17, the projector 10-2 may project a connection completion mark indicating the completion of connection on the screen 40, after acquiring the connection information. As shown in FIG. 6(B), the projector 10-2 projects a connection completion mark IM4, with the direction of projection being the direction specified in Step S8. The connection completion mark IM4 is an image in which an identification image Mr4 is arranged in the four corners of a rectangular image area. The identification image Mr4 in this case is an image of a letter string "OK" but may be an image of any predetermined pattern. When the projector 10-1 detects the connection completion mark IM4, the projector 10-1 ends the operation in the master mode. The projector 10-2 ends the operation in the slave mode and starts the operation in the master mode, on condition that the projector 10-2 is connected to the projector 10-1 via the network NW or that a predetermined time has passed after the connection completion mark IM4 is projected.

In the case where the number of the projectors 10 included in the projection system 1 is four or more, communication of connection information can also be carried out by a similar method.

With the projection system 1 according to the first embodiment described above, the projector 10 operating in the master mode projects the first identification image Mr1 in a plurality of directions while changing the direction of projection. Subsequently, when the second identification image Mr2 projected by the projector 10 operating in the slave mode is detected, the projector 10 operating in the master mode specifies the direction of the projector 10 in question in response to its detected position. Then, the projector 10 operating in the master mode projects the code image Mr3 indicating the connection information, using a specified direction as the direction of projection. Since this mechanism to change the direction of projection expands the projectable area, communication of connection information is possible even if a plurality of projectors 10 is spaced apart from each other to a certain extent. Therefore, the processing of communicating connection information is less susceptible to the influence of the positional relationship between the plurality of projectors 10. Also, since the user need not manually input connection information to the projector 10 operating in the slave mode, the burden of operation on the user is reduced.

Moreover, the projector 10 operating in the slave mode operates in the master mode after acquiring the connection information. Therefore, even if there are projectors at a large distance from each other, like the projector 10-1 and the projector 10-3 shown in FIG. 1, communication of connection information is possible. Utilizing the communicated connection information, the projectors 10-1, 10-2, 10-3 can connect to each other via the network NW and exchange necessary information for carrying out tiled projection. Also, each of the projectors 10-1, 10-2, 10-3 acquires an image to carry out tiled projection from an image supply device via the network NW and the AP 20.

Second Embodiment

Next, a second embodiment of the invention will be described.

In the projection system 1 in this embodiment, the projector 10 operating in the master mode projects the code image Mr3 instead of the first identification image Mr1. Also, the overall configuration and the hardware configuration of the projection system 1 in this embodiment may be the same as in the foregoing first embodiment and therefore the description of these is omitted.

The first projection control unit 103 of the projector 10-1 is a unit which projects a first identification image showing connection information, with the direction of projection of the projection unit 104 changed to a plurality of directions. The first identification image in this case is an image showing the connection information stored in the storage unit 102.

The second detection unit 112 of the projector 10-2 detects the first identification image projected in the image pickup area of the image pickup unit 111, from the image picked up by the image pickup unit 111.

The acquisition unit 116 acquires the connection information, based on the first identification image that is detected.

The third projection control unit 113 performs control to project a second identification image in the direction corresponding to the position where the first identification image is detected, if the connection information is not acquired by the acquisition unit 116.

The second projection control unit 107 of the projector 10-1 performs control to project a third identification image showing the connection information stored in the storage unit 102, with the direction of projection by the projection unit 104 being the direction corresponding to the position where the first identification image is detected. The third identification image is a different image from the first identification image showing the connection information stored in the storage unit 102, and specifically, it shows an image formed by reducing the first identification image.

The acquisition unit 116 acquires the connection information, based on the third identification image that is detected.

The other functions of the projector 10-1 and the projector 10-2 may be the same as in the first embodiment. Also, the projector 10-3 operates in the master mode and the slave mode as well.

Next, the operations in this embodiment will be described.

Figure 7:
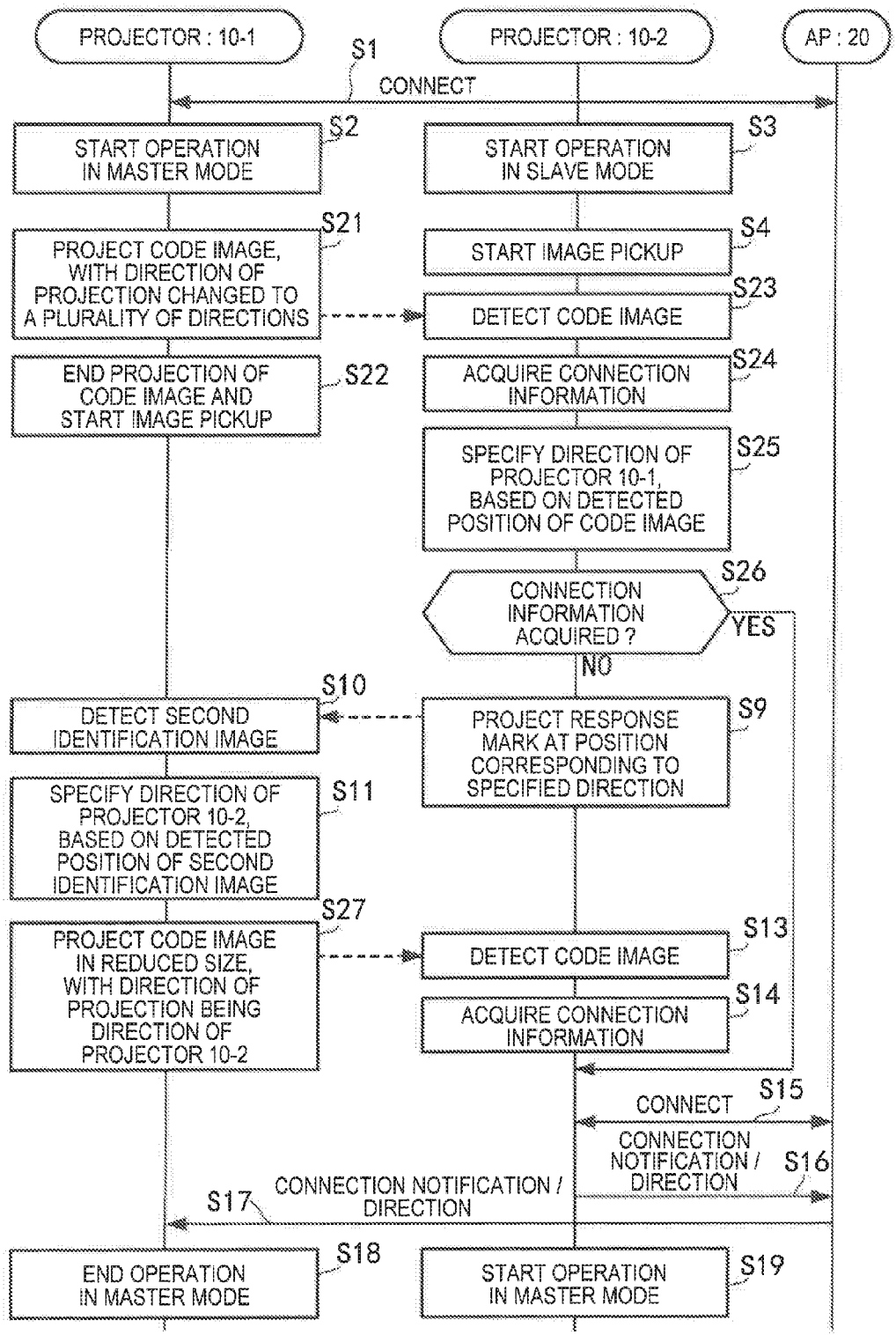
FIG. 7 is a sequence chart showing the processing of communication connection information executed in a projection system according to a second embodiment of the invention.

FIG. 7 is a sequence chart showing the processing of communicating connection information executed in the projection system 1. FIG. 8 is a view for explaining an image projected on the screen 40 in the processing of communicating connection information.

Figure 8A:
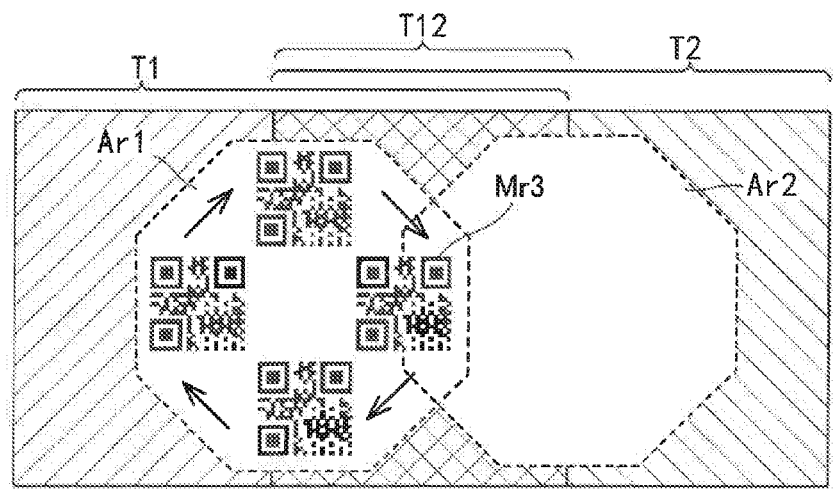
FIG. 8 is a view showing an image projected in the processing of communicating connection information according to the embodiment.

The projector 10-1, after connecting to the network NW via the AP 20 (Step S1), starts the operation in the master mode (Step S2) and then projects a code image Mr3, with the direction of projection changed to a plurality of directions, as shown in FIG. 8(A) (Step S21). The code image Mr3 is equivalent to the first identification image of the invention. The control in Step S21 may be the same as the processing of Step S5, except that the projected image is changed to the code image Mr3. After projecting the code image Mr3 in order, the projector 10-1 ends the projection and starts image pickup of the image pickup area T1 by the camera section 17 (Step S22).

The projector 10-2 carries out the processing of detecting the code image Mr3 from the image picked up by the camera section 17. Here, when the code image Mr3 is projected in an area in the rightward direction within the projectable area Ar1 as shown in FIG. 8(A), the projector 10-2 detects the code image Mr3 from the image picked up by the camera section 17 (Step S23). Next, the projector 10-2 attempts to acquire connection information, based on the code image Mr3 (Step S24). Then, the projector 10-2 specifies the direction of the projector 10-1, based on the position where the code image Mr3 is detected (Step S25). After that, the projector 10-2 determines whether connection information is acquired or not (Step S26). In the case of the projection shown in FIG. 8(A), the entirety of the code image Mr3 is projected in the image pickup area T2. In this case, the projector 10-2 acquires connection information, based on the code image Mr3. Then, the projector 10-2 determines that it is "YES" in Step S26, and proceeds to the processing of Step S15. After that, the processing of each of Steps S15, S16 is carried out and this is the same as in the foregoing first embodiment. In Step S17, when the projector 10-2 connects to the network NW via the AP 20, the projector 10-2 sends a connection notification indicating the completion of connection and the direction of the projector 10-1 specified in Step S25, to the projector 10-1 via the AP 20 and the network NW. The subsequent processing of each of Steps S18, S19 is the same as in the foregoing first embodiment.

Figure 8B:
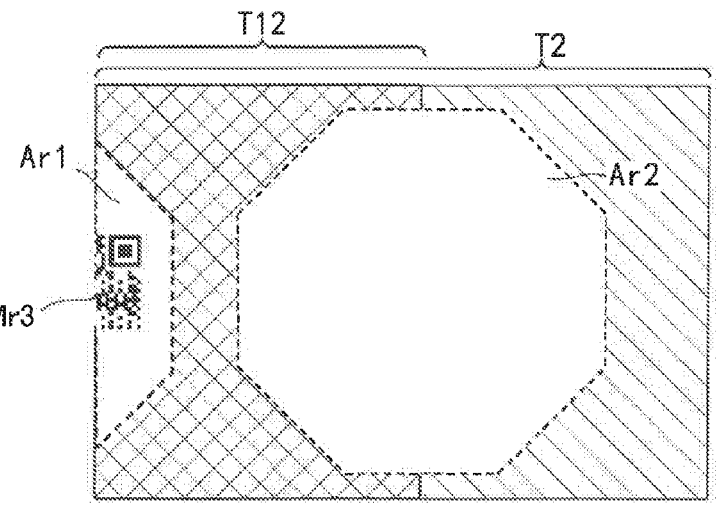

When the distance between the projector 10-1 and the projector 10-2 is large, the entirety of the code image Mr3 may not be projected in the image pickup area T2 in some cases. In the example of FIG. 8(B), the projector 10-2 picks up an image of the right half of the code image Mr3 and cannot pick up an image of the left half. In this case, the projector 10-2 can detect the existence of the code image Mr3 and the direction of the projector 10-2 in Step S25, for example, by recognizing the symbol of the code image Mr3, but cannot acquire the connection information. Thus, the projector 10-2 determines that it is "NO" in Step S26. Then, the projector 10-2 projects a response mark IM2, with the direction of projection being the direction of the projector 10-1 specified in Step S25 (Step S9). The projected image may be the same as in FIG. 5(C).

Figure 8C:
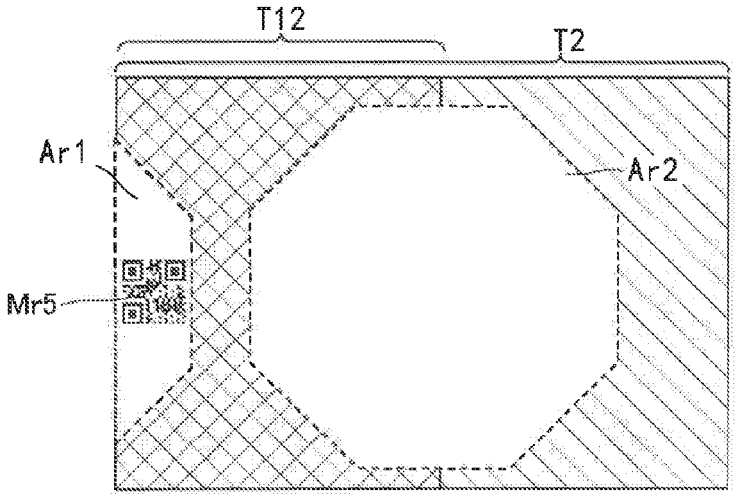

The projector 10-1 detects the second identification image Mr2 of the response mark IM2 projected in the image pickup area T1 (Step S10). Next, the projector 10-1 specifies the direction of the projector 10-2, based on the position where the second identification image Mr2 is detected (Step S11). Next, the projector 10-1 projects the code image in a reduced size, with the direction of projection being the direction of the projector 10-2 specified in Step S11 (Step S27). As shown in FIG. 8(C), the projector 10-1 projects a code image Mr5 showing an image formed by reducing the code image Mr3. The reason for the reduction is that the entirety of the code image showing the connection information is to be projected in the image pickup area T2. The projector 10-2 detects the code image Mr5 in Step S13 and then acquires the connection information from the code image Mr5 (Step S14). After that, the processing of each of Steps S15 to S19 is carried out and this is the same as in the foregoing first embodiment. As described above, the specified direction of the projector 10-1 may be communicated in Step S17.

If it is determined in Step S26 that the projector 10-2 has acquired the connection information, a connection notification and the specified direction are sent from the projector 10-2 to the projector 10-1 in Step S17. Therefore, in that case, the image pickup processing of Step S22 is ended and the processing of Step S18 is executed.

If the connection information is not acquired in Step S14, either, the processing of Steps S9 to S27 may be executed again so that the code image is reduced further. However, if the code image is too small, decoding of the connection information is impossible. Therefore, if communication of connection information is impossible, the projector 10-1 may notify the user, for example, by projecting an image on the screen 40.

With the projection system 1 according to the second embodiment described above, the projector 10 operating in the master mode projects the code image Mr3 while changing the direction of projection. Therefore, when the projector 10 operating in the slave mode acquires connection information from this code image, the time until connecting to the network NW is shorter than in the case of the foregoing first embodiment. Also, even when this connection information is not acquired, the projector 10 operating in the master mode projects the code image Mr5 formed by reducing the code image Mr3, in the direction of the projector 10 operating in the slave mode. Therefore, communication of connection information is possible even if the projectors 10 are spaced apart from each other to a certain extent. In addition, the projection system 1 in this embodiment achieves effects equivalent to those of the foregoing first embodiment.

[Modifications]

The invention can be carried out in different configurations from the foregoing embodiments. Also, the modifications described below may be combined with each other according to need.

In each of the foregoing embodiments, the projector 10 changes the direction of projection using the lens shift mechanism. However, the specific mechanism for this change is not particularly limited. For example, the projector 10 may change the direction of projection by a mechanism in which a mirror as a reflection member and an optical member such as a lens are combined.

The projector 10 operating in the master mode need not necessarily be configured to project an identification image, with the direction of projection being the four directions of the up-down directions and the left-right directions. For example, in the case where the projectors 10 are next to each other only in the left-right or up-down directions, an identification image may be projected only in two directions. Also, the projector 10 may project an identification image, with the direction of projection being more directions than four directions.

The projector 10 operating in the master mode may have the function of access point. In this case, the projector 10 operating in the slave mode connects to the projector 10 operating in the master mode, using connection information.

The projector 10 may be a projector employing a reflection-type liquid crystal panel, digital micromirror device (DMD) or the like.

A part of the configuration or the operations of the projection system 1 in the foregoing embodiments may be omitted according to need.

In the foregoing embodiments, a method for communicating connection information for network connection between the projector 10 operating in the master mode and the projector 10 operating in the slave mode is described. However, in the invention, information communicated between the projector 10 operating in the master mode and the projector 10 operating in the slave mode is not limited to connection information. The driving conditions of each other (luminance, color tone, projection size or the like of projection image) can be communicated as well. If the driving conditions of each other are communicated, images projected by tiling can be connected together smoothly.

In the foregoing embodiments, each function realized by the projector 10 can be realized by a combination of a plurality of programs or by a linkage between a plurality of hardware resources. Also, if the functions of the projector 10 are realized using programs, these programs may be provided in the state of being stored in a computer-readable recording medium such as a magnetic recording medium (magnetic tape, magnetic disk (HDD (hard disk drive)), FD (flexible disk) or the like), optical recording medium (optical disk or the like), magneto-optical recording medium, or semiconductor memory, or may be distributed via a network. Also, the invention can be understood as a control method for a projector.

REFERENCE SIGNS LIST

1 . . . projection system, 10-1, 10-2, 10-3 . . . projector, 101, 118 . . . connection unit, 102, 117 . . . storage unit, 103 . . . first projection control unit, 104, 114 . . . projection unit, 105, 111 . . . image pickup unit, 106 . . . first detection unit, 107 . . . second projection control unit, 112 . . . second detection unit, 113 . . . third projection control unit, 115 . . . third detection unit, 116 . . . acquisition unit, 11 . . . CPU, 12 . . . ROM, 13 . . . RAM, 14 . . . operation section, 15 . . . image processing section, 16 . . . projection section, 161 . . . light source, 162 . . . liquid crystal panel, 163 . . . projection lens section, 164 . . . light source control section, 165 . . . panel drive section, 166 . . . lens drive section, 17 . . . camera section, 18 . . . storage section, 19 . . . communication section, 20 . . . AP, 30 . . . pointer, 40 . . . screen

The invention claimed is:

1. A projector comprising:
a connection unit which connects to a network;
a storage unit which stores connection information used for connection to the network;
a projection unit which projects an image on a projection surface;
a first projection control unit which projects a first identification image, with a direction of projection by the projection unit changed to a plurality directions;
an image pickup unit which picks up an image of the projection surface;
a first detection unit which detects a second identification image projected in an image pickup area of the image pickup unit by another projector, from the image picked up by the image pickup unit; and
a second projection control unit which projects a third identification image showing the connection information stored in the storage unit, with the direction of projection being a direction corresponding to a position where the second identification image is detected,
wherein the another projector detects the third identification image showing the connection information, acquires the connection information from the third identification image, and uses the acquired connection information to connect to the network.

2. The projector according to claim 1, comprising:
a second detection unit which detects the first identification image projected in the image pickup area by the another projector, from the image picked up by the image pickup unit, in the case of acquiring the connection information stored in the storage unit from the another projector;
a third projection control unit which projects the second identification image, with the direction of projection being a direction corresponding to a position where the first identification image is detected;
a third detection unit which detects the third identification image projected in the image pickup area by the another projector, from the image picked up by the image pickup unit; and
an acquisition unit which acquires the connection information, based on the third identification image that is detected,
wherein the connection unit connects to the network, using the connection information that is acquired.

3. A projector comprising:
a connection unit which connects to a network;
a storage unit which stores connection information used for connection to the network;
a projection unit which projects an image on a projection surface;
a first projection control unit which projects a first identification image showing the connection information stored in the storage unit, with a direction of projection by the projection unit changed to a plurality directions;
an image pickup unit which picks up an image of the projection surface;
a first detection unit which detects a second identification image projected in an image pickup area of the image pickup unit by another projector, from the image picked up by the image pickup unit; and
a second projection control unit which projects a third identification image showing the connection information stored in the storage unit, with the direction of projection being a direction corresponding to a position where the second identification image is detected,
wherein the another projector detects the third identification image showing the connection information, acquires the connection information from the third identification image, and uses the acquired connection information to connect to the network.

4. The projector according to claim 3, comprising:
a second detection unit which detects the first identification image projected in the image pickup area by the another projector, from the image picked up by the image pickup unit, in the case of acquiring the connection information stored in the storage unit from the another projector;
an acquisition unit which acquires the connection information, based on the first identification image that is detected;
a third projection control unit which projects the second identification image, with the direction of projection being a direction corresponding to a position where the first identification image is detected, if the connection information is not acquired; and
a third detection unit which detects the third identification image projected in the image pickup area by the another projector, from the image picked up by the image pickup unit,
wherein the acquisition unit acquires the connection information, based on the third identification image that is detected, and
the connection unit connects to the network, using the connection information that is acquired.

5. The projector according to claim 3, wherein
the second projection control unit projects the third identification image showing an image formed by reducing the first identification image.

6. The projector according to claim 1, wherein
the projection unit includes a projection lens which emits image light representing an image toward the projection surface, and a drive unit which causes the projection lens to move, and
the first projection control unit and the second projection control unit control the drive unit to change the direction of projection.

7. The projector according to claim 1, wherein
the image pickup unit is an image pickup unit for correction processing to pick up an image of the projection surface and correct the image, or for position detection to detect a position of a pointer pointing to a position on the projection surface.

8. A control method for a projector comprising:
a connection unit which connects to a network;
a storage unit which stores connection information used for connection to the network; and
a projection unit which projects an image on a projection surface, the control method comprising:
projecting a first identification image, with a direction of projection by the projection unit changed to a plurality directions;
picking up an image of the projection surface;

detecting a second identification image projected in an image pickup area in the picking up of the image by another projector, from the image that is picked up; and projecting a third identification image showing the connection information stored in the storage unit, with the direction of projection being a direction corresponding to a position where the second identification image is detected, wherein the another projector detects the third identification image showing the connection information, acquires the connection information from the third identification image, and uses the acquired connection information to connect to the network.

9. A control method for a projector comprising:

a connection unit which connects to a network;

a storage unit which stores connection information used for connection to the network; and a projection unit which projects an image on a projection surface, the control method comprising:

projecting a first identification image showing the connection information stored in the storage unit, with a direction of projection by the projection unit changed to a plurality directions;

picking up an image of the projection surface;

detecting a second identification image projected in an image pickup area in the picking up of the image by another projector, from the image that is picked up; and projecting a third identification image showing the connection information stored in the storage unit, with the direction of projection being a direction corresponding to a position where the second identification image is detected, wherein the another projector detects the third identification image showing the connection information, acquires the connection information from the third identification image, and uses the acquired connection information to connect to the network.

10. The projector according to claim 1, wherein the first identification image is projected in order with the four directions of up-down directions and the left-right directions.

* * * * *